Aug. 12, 1930.    M. P. WINTHER    1,772,473
POWER TRANSLATOR
Filed March 7, 1927    3 Sheets-Sheet 3
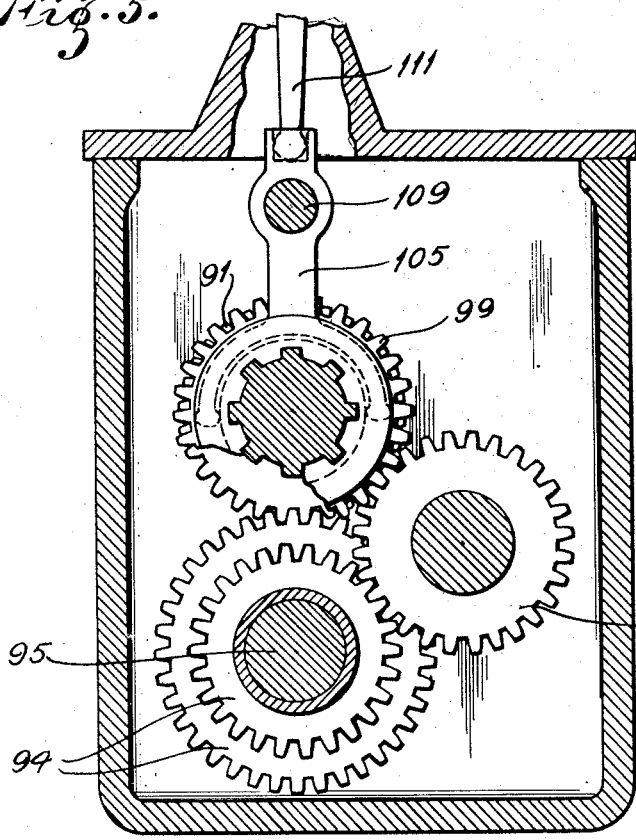
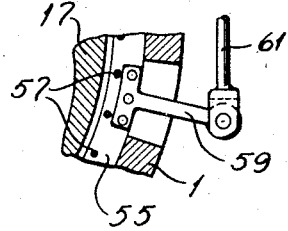
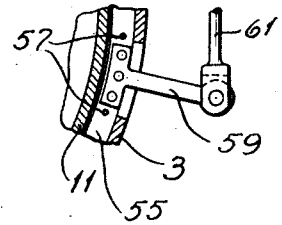
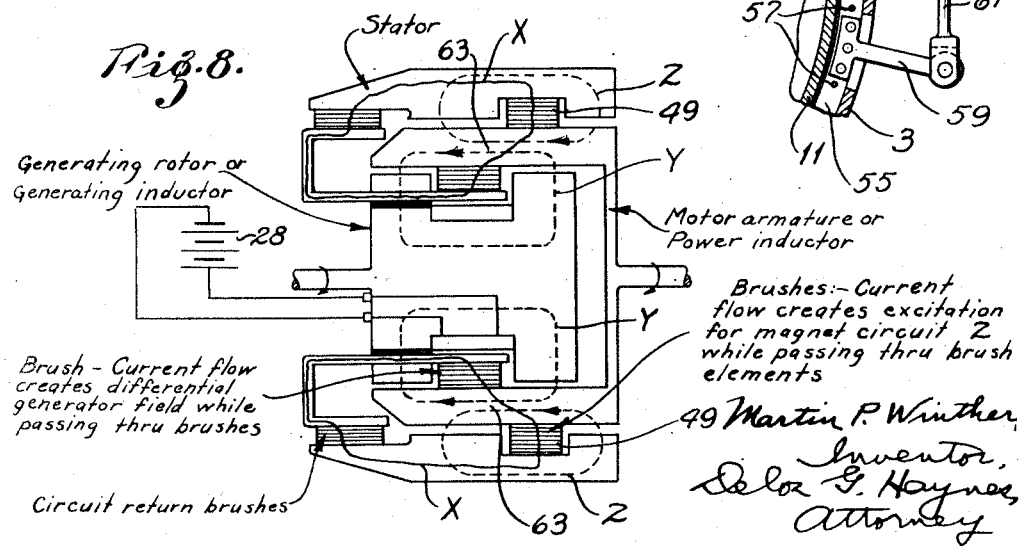

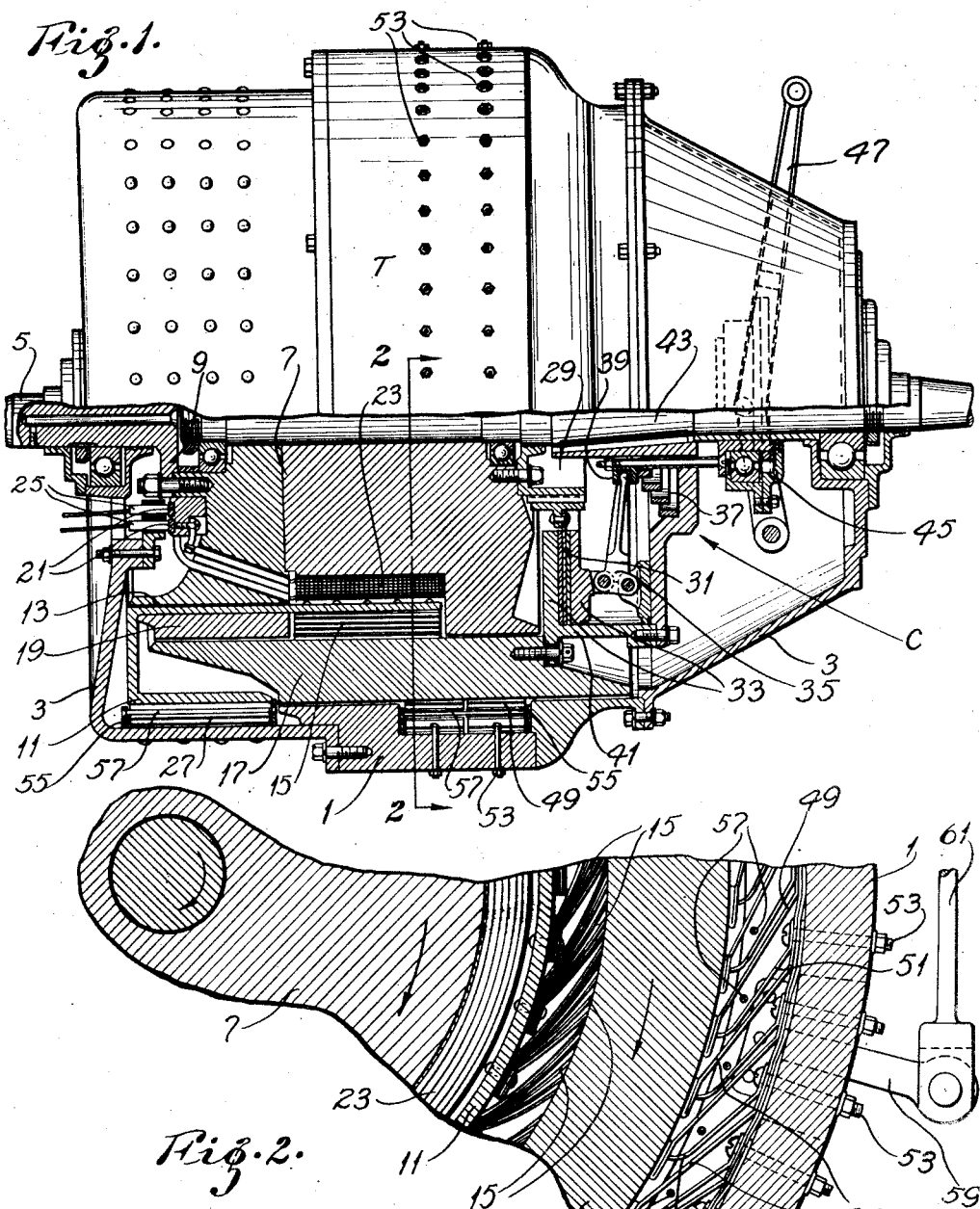

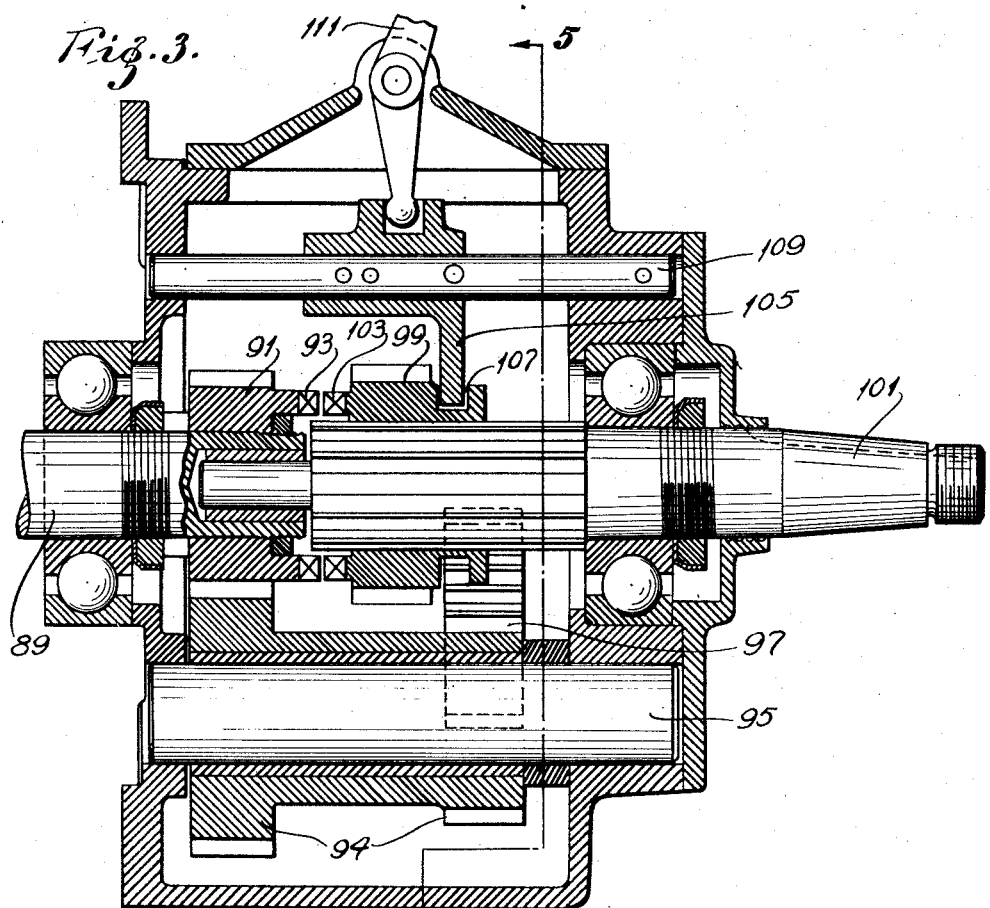
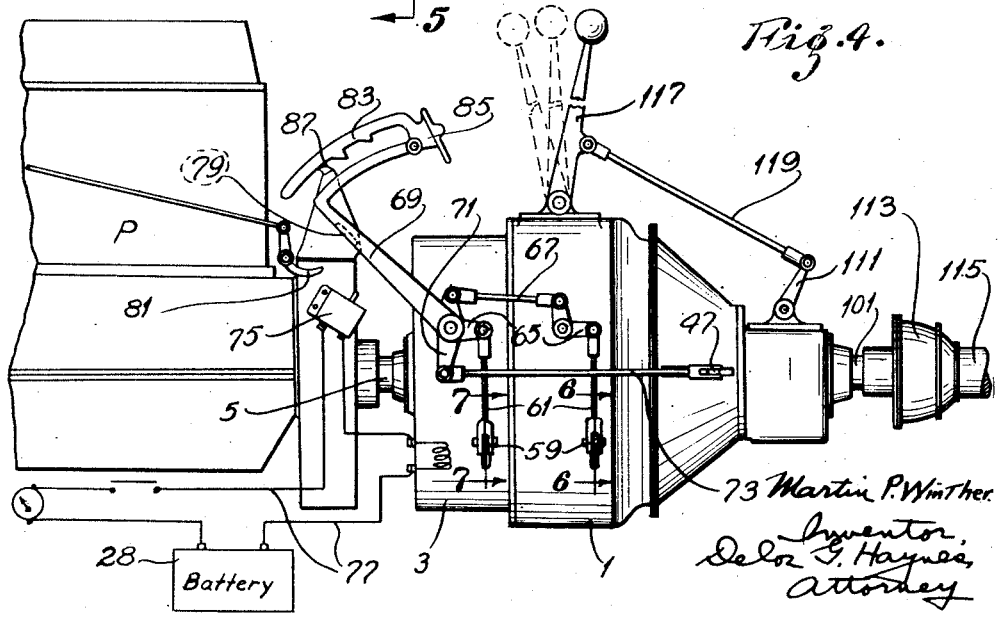

Patented Aug. 12, 1930

1,772,473

UNITED STATES PATENT OFFICE

MARTIN PHILLIP WINTHER, OF ST. LOUIS, MISSOURI, ASSIGNOR TO THE WINTHER COMPANY, OF WILMINGTON, DELAWARE, A CORPORATION OF DELAWARE

POWER TRANSLATOR

Application filed March 7, 1927. Serial No. 173,495.

This invention relates to power translators and with regard to certain more specific features, to an electric power translator for use in motor vehicles and the like.

Among the several objects of the invention may be noted the provision of means for translating power from a prime mover to the driving wheels of a vehicle, adapted to give relatively high starting torques, an almost straight line torque-speed curve, and inherent automatic regulation of power current such as to permit of a practically constant rate of rotation of the prime mover within the limits of vehicle speed ranges ordinarily encountered in commercial use.

Another object of the invention is to provide an automatic electrical torque changing device for vehicle drives adapted to be used in starting, accelerating and hill climbing, combined with a direct mechanical drive adapted to be used under conditions of substantially constant velocity; for the latter purpose an automotive type of clutch being used for direct drive under free running conditions.

Another object of the invention is to provide an electrical translator which cannot burn out because of excess current flow.

Another object of the invention is to eliminate all brush friction under conditions of direct mechanical drive.

Another object of the invention is to provide a device which is the utmost in simplicity having a low cost of manufacture, installation and upkeep and which is substantially noiseless, having but few wearing parts and adapted to outlast the vehicle in which it is placed.

Another object of the invention is to provide a device of the class described having an extremely high weight-efficiency with a fuel economy equal to that of a mechanically driven vehicle but which has the smooth starting characteristic of an electrically driven vehicle.

Other objects will be in part obvious and in part pointed out hereinafter.

In the accompanying drawings, in which are illustrated certain embodiments of the invention, Fig. 1 is a side elevation of the translator showing parts broken away;

Fig. 2 is an enlarged fragmentary cross section taken on line 2—2 of Fig. 1;

Fig. 3 is a longitudinal section taken through a gear box containing reverse gearing;

Fig. 4 is a diagrammatic side elevation showing the application of the translator and also shows certain control elements;

Fig. 5 is a cross section taken on line 5—5 of Fig. 3;

Fig. 6 is a fragmentary section taken on line 6—6 of Fig. 4;

Fig. 7 is a fragmentary cross section taken on line 7—7 of Fig. 4; and

Fig. 8 is a schematic diagram of the current circuits and magnetic flux circuits.

Corresponding reference characters indicate corresponding parts throughout the several views of the drawings.

Broadly considered, the present invention comprises a vehicle having a prime mover therein driving combined current generating and motoring means, said means being adapted to function acyclically and without the use of external circuits for controlling purposes. A current of electricity having a low voltage but high amperage is generated by the relative movement of two elements in a magnetic field and is re-converted into mechanical energy before it travels an appreciable distance (about six inches in the present embodiment). Excessive resistance losses and weight of conductors are thus eliminated.

Furthermore, portions of the rotors and stator are used to conduct the current, whereby these parts are made to perform dual functions.

Further, advantage is taken by causing the magnetism in the generating circuit to operate the motor armature, whereby weight is greatly reduced. This weight reduction occurs because the greatest percentage of total weight in generators or motors is in the steel carrying the magnetic flux. By means of this invention a single suitable mass of steel carries the flux for two electrical units, namely the generating and motoring units. In other words to obtain sufficient magnetic flux in an electric motor to give it the necessary torque requirements for driving a vehicle propeller shaft, a given amount of steel is required, depending upon the design of the machine. There is, however, a practical low limit to the weight beyond which no designer can go. In this invention the motor is designed to use not only its own individual magnetic flux, but also the magnetic flux of the generator to produce driving torque. In this manner weight is cut considerably. Another step in saving of weight is made by using the motor armature as a part of the magnetic circuit of the generator.

The invention goes further in the saving of weight. The steel in the motor armature magnetic circuit performs the dual purpose of not only carrying the magnetic flux, but also carries the power current. This also applies to the motor magnet frame. Therefore, no added weight is had for current carrying members in the motor. This is possible because there is only a single current path. Neither are there any conventional magnetizing coils in the motor magnetic circuit.

Other broad features will appear hereinafter, together with certain of the more detailed features, the latter of which require explanation for a complete understanding of the machine.

Referring now more particularly to Fig. 1, there is illustrated at numeral 1 a stator formed with a stationary housing 3, enclosing certain of the elements of the translator T and a clutch C.

Rotatably borne in said housing 3 is a shaft 5, connected directly to the preferably internal combustion prime mover P (see Fig. 4) and carrying therewith a generating rotor 7. The rotor 7 comprises suitable blocks of steel held together and bolted to a suitable flange 9 on the shaft 5. Ths rotor 7 includes an amply proportioned copper generating inductor element 11 held therto by a suitable ring 19 but insulated therefrom by insulation 13. Spirally arranged copper brushes 15 are fastened to an arm of said inductor 11, said brushes extending counter-clockwise to the normal direction of rotation of the rotor 7 (see Fig. 2). These brushes wipe the inner face of a motor or power inductor rotor 17, to be described.

Slip rings 21, held to but insulated from the rotor 7, are electrically connected to separately excited coils 23, also mounted on said rotor 7. The slip rings 21 are fed current through brushes 25 from a suitable battery 28, such as is ordinarily carried on a vehicle (see Figs. 4 and 8). The coils 23 are insulated from the rotor 7 but do not carry heavy currents.

Another arm of the inductor 11 engages stationary circuit return brushes 27, held to the casing 3. These brushes are arranged in an angular direction and bear on the inductor 11.

The rotor 7 carries at its rear end a clutch drum 29 which supports a clutch disc 31, rotatable with said rotor 7. The disc 31 is adapted to be frictionally engaged and disengaged with the faced elements 33 of said clutch C by the clamping action exerted by said elements 33 under action of a toggle linkage 35 and under pressure of a spring 37 acting through a collar 39.

The elements 33 are adapted to rotate with the outer drum 41 of the clutch, said outer drum 41 of the clutch being fastened to said power or motor inductor element 17 and to a drive shaft 43. The drive shaft 43 has suitable pilot bearings in the rotor 7. The spring 37 may be controlled to open and close the clutch connections between the plate 31 (connected with the rotor 7) and the elements 33 (connected with the power inductor 17) by means of a throw-out mechanism 45, controllable from a suitable lever 47. Forward positioning of the lever 47 permits the spring 37 to close the clutch. The rotor 7 and inductor 17 rotate in the same direction with respect to the frame 3 (Fig. 2) when the clutch is open or closed.

The inductor 17 comprises a drum rotatable with respect to the stator 1 at all times of operation and rotatable with respect to the rotor 7 when the clutch is open. When the clutch is closed the inductor 17 and rotor 7 rotate together as a unit.

As above stated, the brushes 15 bear upon the inner surface of the drum comprising the power inductor 17. The outer surface of the inductor 17 is engaged by a set of brushes 49 held to the stator 1. These brushes are held in contact by steel springs 51, also held to the stator 1 by the same bolts 53 which hold said brushes. The arrangement of springs and brushes is such that if a spring is lifted from its brush, it engages the next brush to lift it, whereby the shape of the brush arms may be made without curvature and consequently a better line of approach or recess maintained between the brush face and the drum face as a contact or disconnection takes place. The circuit return brushes 27 and the brushes 49 have similar arrangements.

In order to lift the brushes 27 or 49 from their engaging surfaces when desired, a device such as shown in Figs. 1 and 2 is used, comprising squirrel cages 55 rotatably mounted in the frame or casing 3 and having cross pins 57 adapted to engage and disengage the springs 51 when the cage is rotated. By this means the brushes 27, 49 may be lifted from said engaging surfaces when desired. Arms 59 extending through suitable slots in the casing and pinned to connecting links 61 provide means for controlling the brush contact. The brushes 15 always contact.

Current is collected from the motor armature or power inductor 17 by means of the brush elements 49 fastened, as desired, directly to the motor magnet frame 1. These brush elements 49 are only a few inches long. The power circuit X (Fig. 8) carries such a high number of amperes that sufficient excitation for the motor magnet frame is obtained by the flow of current through the fraction of a turn around the machine made by each brush element. Therefore, each brush itself acts as and comprises a series field coil which acts in the operation of the motor. The brush angle is as shown in the drawings and the brush elements wipe the armature. Thus the series field coils for this heavy current machine, requiring only a fraction of a turn each, comprise the collector brushes. Two elements are thus combined and simplified.

Current regulation is worked out as follows:

The power current is so large, that it would not be feasible to convey it to a controller for regulating the operation of the combined electric units. The internal combustion engine P must run at fairly high speeds to develop the horsepower required for quick acceleration of the vehicle. The torque curve of the engine is nearly flat as far as the present purpose is concerned, because only the flat range of the curve is used. As the torque required to drive the generating portion of the unit is in direct proportion to the active lines of magnetic force cut by the generating inductor 11 and the amperes flowing in the single path circuit X; it is evident that the magnetic flux Y (see Fig. 8) of the generating portion of the circuit, due to the exciting force at 23 must be reduced in direct proportion to the increase in current flow if constant engine speed is to be maintained.

A shunt generator coil will not give the proper characteristics, so the coil 23, energized from the storage battery 28 of the vehicle, (in a bus this would be the starting and lighting battery) is placed within the magnetic field of the generator flux Y. The current collecting brushes 15 are placed adjacent to this coil, also in the magnetic field of the generating circuit.

These current collection brushes 15, as described bear directly upon the motor armature 17, and are inclined to the motor armature. These brushes are so inclined that the generated current passing through them has the effect of partly neutralizing the effect of the generator separate excitation coil 23. These brushes are inclined so as to wipe the surface of the motor armature upon rotation of the prime mover and they incline away from the motor armature movement and not against it. When the engine rotates, they will slide over the surface of the armature without gouging it.

These brushes comprise the differential field coil of the generator electric circuit. However, it is not practicable to obtain a straight line curve of effective magnetic strength of the generator by means of only a differential field coil bucking the separate exciting coil 23. Therefore, a magnetic interference between the magnetic circuit Y of the generator and the magnetic circuit Z of the motor is set up in the common path 63 of both magnetic circuits which lie side by side in the common path, said path comprising a portion of the motor armature.

The motor armature need and should not carry at the same time all the flux of a fully magnetized generator field Y and a fully magnetized motor field Z. For the purpose of creating the torque changing characteristics desired, it is desirable that the generator field Y be strong when the motor field Z is weak, and vice versa. Therefore, an ideal condition is a characteristic of the motor armature 17 whereby it permits of carrying only the mean number of lines required in both field circuits Y and Z passing through it simultaneously. In the present invention, such a condition is approached, owing to the sharp leveling off of the saturation curve near the point at which the armature is required to operate under said conditions.

If, for example the engine is supposed to be idling, and the excitation coil 23 of the generator rotor 7 is cut in, the field circuit Y of the generator is magnetized to approximately 100,000 lines of force per square inch of area. Practically no current is flowing through the power circuit X, so that the series field of motor is not magnetized. The steel in the motor armature 17 will be magnetized to about 75,000 lines per square inch on account of its greater area. If the speed of the engine is increased, the current X starts to flow and it builds up magnetic lines in the motor magnetic circuit Z. As the motor magnetic circuit Z builds up, it affects the permeability of the motor armature 17 to the generator flux Y, and consequently reduces the effective lines of force in the generator magntic circuit Y.

At constant speed of the generator 7, the current flow will depend upon the resistance of the power circuit X. This resistance remains practically constant at a given temperature, except for the counter electromotive force developed in the motor armature 17 when running. For practical purposes, owing to the short intermittent periods of time the electric elements of the transelector is in use during starting and hill climbing, temperature rises beyond a few degrees above outside air can be ignored. Therefore, it follows that the counter electromotive force of the motor will almost entirely govern the current flow with a given engine speed.

An increase in torque requirements at the vehicle driving wheels will automatically reduce the magnetic strength of the generator field Y in the manner described, enough to balance the torque developed by the engine.

A consideration of the circular magnetization of the homo-polar faces of the generator and motor, due to the flow of the power current past them reveals the fact that this is normally analogous to the cross field set up in direct current generators and motors, and is compensated for in the motor element by an increase in ampere turns in the field coil brushes 49. It is used in the generator element to assist in creating a drooping voltage charactertistic.

The absence of need of any substantial amounts of insulating materials in the unit, taken into consideration with the fact that the power current is carried in the magnet members, makes it possible to have a power circuit carrying path, of dimensions so generous that it practically cannot be burnt out. Further, the watt loss is greatest in the brush elements where good radiation can be obtained. The watt loss in standard direct current machines occurs principally in current carrying elements encased in insulating material, making radiation of heat difficult; whereas the watt loss in the present invention occurs in elements that comprise mostly bare metal exposed to the air. Hysteresis loss is absent and eddy current loss is negligible in a wall made unit of this invention having concentric air gaps.

The device is cheap to manufacture, as the magnets and armatures are circular in shape, and require only plain straight machining for the most part. The brush elements are very cheap to manufacture because they may be made by stamping. Six circular shaped plain masses of soft steel constitutes some 90% of the weight of the entire machine.

The maximum current flow through the power circuit is of the order of 65,000 to 70,000 amperes in a 100 horse power machine (transmitting 50 horse power electrically). The maximum torque (stalled) at the propellor shaft end is about of the order of 800 foot pounds. The torque required to operate the generator is of the order of 290 foot pounds at 1750 revolutions per minute.

The torque curve of the propellor shaft during electric driving (clutch open) drops to the equivalent of the engine torque at a speed corresponding to 18 miles per hour vehicle speed, or about 900 revolutions per minute of propellor shaft.

When the vehicle is operated, the change from electric drive to direct drive will ordinarily be made at 18 to 22 miles per hour. When this change is made the clutch C is permitted to engage, thereby directly connecting engine and axle mechanically. The generator rotor element 7 driven by the engine P, and the motor armature 17 will then rotate at the same speed, being tied together by the clutch C. As there is no relative motion between the two rotating members, there is no sliding motion of the brush contactors 15 between the two rotating members. The brush elements 49 in the motor field, and the circuit return brush elements 27 connecting the motor or stator frame 3 with the generator inductor 11, would now offer a frictional resistance to turning of the direct drive, were it not that these brush elements are raised away from contact with their respective drums at the same time the clutch is closed.

The manner of accomplishing the above is to pin the connecting rods 61 (Fig. 4) to bell crank levers 65 which in turn are coupled to a shaft 67 controlled by a foot pedal arm 69. The arm 69 also controls an arm 71 connected to said clutch lever 47 by a rod 73. It should be noted that in Fig. 1, the position of the throw-out linkage (including the lever 47) is at 90 degrees to the corresponding elements shown in Fig. 4. This is done for clarity and it is to be understood that the position of said linkage may be readily changed in position without changing the operation.

Should the clutch be closed with a heavy current flowing through the power circuit X, the brush elements might cause damaging sparks to occur when leaving the drums. Blistering might also occur. To avoid this, the switch 75 which governs the energizing of the generator exciting coil 23 through lines 77 is opened before the brushes leave the drums. The opposite movements occur when the clutch is opened for electric driving. First the clutch is opened, then contact brushes are set on the drums, then the circuit is closed for energizing the generator field. The switch 75 is engaged by said arm 69 to accomplish the above.

No sparks can be observed at the breaking of contact of the brushes no matter what the relative generator and motor speeds may be when the break occurs, provided the exciting circuit has been broken even a split second ahead of the raising of brushes. There is of course friction at the brush contacts. At idling of engine this is not detrimental, when only the internal brushes 15 between generator and motor rotor are engaged. This is because these brushes 15 are so made that at the engine speed called idling they rub lightly over the drum 17, barely making contact. The friction then is negligible. When the engine is speeded up for driving, centrifugal force acts upon the thin copper leaf brush elements 15, which rotate with the generator rotor 7, in a manner to increase their contact pressure to a value sufficient to convey current with a minimum of loss.

When the outer brushes 27, 49 are dropped into contact, that is, when the engine is idling, a slight increase in drag on the engine is noticeable. To avoid the possibility of stopping the engine when this is done, a stop 79 is connected to the pedal arm 69, which will slightly open the engine throttle by engaging a lug 81, thereby keeping the engine idling at the same speed as before brushes were dropped into contact.

The clutch operating pedal is similar to the conventional clutch pedal of motor vehicles. In addition a two position ratchet stop 83 is provided, actuated by tilting the clutch pedal pad 85. A dog 87 on the engine frame is adapted to be engaged by said ratchet stop 83. When the clutch pedal is up, the clutch is closed, the brushes are lifted and the exciting coil circuit 23 is broken. The switch 75 opens by disengagement with the arm 69. When the clutch pedal is half-way depressed (where it may be hooked and left at the will of the operator) the clutch is open, brushes are lifted and exciting coil circuit 23 is broken. When the clutch pedal is fully depressed (where it can be hooked and left at the will of the operator) the clutch is open, brushes are down in contact and exciting coil circuit 23 is closed. The brush elements on the outside of the drums are actuated, when opening and closing, by means of said squirrel cage construction.

Normally, approximately one volt electromotive force is generated in the generator inductor 11, that is, as the motor armature 17 builds up speed from a start, approximately one volt electromotive force is maintained in the generator inductor until the motor armature reaches a speed of about 1000 revolutions per minute. Then the voltage will drop until the relative speed between rotating elements reaches zero when no current is generated. In view of this phenomenon it can readily be seen that the device is a useful electrical drive during the starting range up to about 1300 revolutions per minute of the propellor shaft. It is desirable in the present embodiment to use a gasoline engine with a torque of approximately 300 to 340 foot pounds and having a safe top operating speed of the order of 1750 revolutions per minute. This is in line with good commercial practice of the present day.

Reversing of the vehicle drive is accomplished by means of a simple reversing gear, mounted either at the rear end in unit with the transelector, or by independent mounting. In the present embodiment the reverse gear box (Figs. 3 to 5) contains an input shaft 89 adapted to be coupled to the shaft 43 of the electrical unit, said shaft 89 carrying a pinion 91 having a crown 93. The pinion 91 drives a gear nest 94 rotatable on a counter shaft 95. An idler 97, under certain conditions connects the nest 94 with a pinion 99 splined to the output shaft 101, said pinion 99 also having a crown element 103 adapted to engage the crown element 93 upon longitudinal movement of said gear 99. The position of the splined gear 99 is governed by a yoke 105 cooperating with a recess 107 and movable on a guide support 109. The yoke is controlled from a lever 111.

The shaft 101 is rotatably piloted in the shaft 89 and it is evident that by throwing the lever 111 rearwardly from its Fig. 3 position that a direct connection is had between said shafts 89, 101 by way of the crown couplings 93, 103. The gears 97 and 99 are then out of mesh.

When the lever 111 is thrown forwardly from its Fig. 3 position, the crown coupling is opened and the gears 97, 99 mesh, whereby a reverse movement remains obtained at a reduced rate because of a gear reduction had by way of the gears 91, 94, 97 and 99.

It is clear from Fig. 3 that a mid-position of the lever 11 gives a neutral position in which the crown connection is open and said gears 97, 99 are out of mesh.

The output shaft 101 of the gear box is coupled to the vehicle driving wheels by way of the conventional system including the universal joint 113 and drive shaft 115 shown in Fig. 4. The lever 111 is controlled from a suitable shifter lever 117 connected thereto by a rod 119.

For the purpose of describing this invention it has been necessary to assume a concrete condition relative to the generating magnetic flux Y. The magnetic flux Y is considered not to rotate in space. Should the magnetic flux Y rotate in space, with the coil 23 setting up said flux, the nomenclature in this description would need be changed and the rotor 17 would then be the inductor for both the magnetic circuits X and Y. The copper drum 11 would then act as a conductor only.

However, whether the magnetic flux rotates or not, is of no importance relative to the operation of this invention. The results are the same in so far as the magnetic circuit is cut by relative motion between elements taking either view or theory of operation.

Among the authorities for assuming that the flux does not rotate in space is the late James Proteous Steinmetz. This description is predicated upon the theory that the magnetic flux is stationary with reference to the machine.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The power translator comprising a generator having a single magnetic circuit, a motor including a frame having a single magnetic circuit, a rotatable motor armature acting as the common return for both magnetic circuits, said magnetic circuits being located side by side and substantially parallel in said armature, the magnetic capacity of the armature being less than the sum of the maximums of said two magnetic circuits.

2. The power translator comprising a generator, a motor, a common path for both magnetic circuits of generator and motor, said common path being restricted in magnetic capacity such that at no time will it afford a path for both full magnetic circuits simultaneously.

3. The power translator comprising an acyclic generator, an acyclic motor, a single path for the electrical power circuit thereof, a clutch between motor and generator for mechanically connecting them, brush elements operating upon the generator and motor rotating elements, said brush elements forming the active magnetic fields for the operation of said acyclic motor.

4. The power translator comprising an acyclic generator, an acyclic motor, a single path electrical power circuit, a clutch between motor and generator for mechanically connecting generator and motor together for direct driving, brush elements operating upon the motor rotating element forming part of said power circuit, said brush elements providing the motor field excitation.

5. The power translator comprising an acyclic generator, an acyclic motor, a single path power current circuit, means for separately exciting and forming a generator field, brushes conveying said power current from the generator armature to the motor armature so arranged as to create a differential magnetization in said generator field.

6. The power translator comprising a generator, a motor, a power circuit therebetween, a clutch between generator and motor, adapted to be opened for electrical driving and closed for mechanical direct driving, slidable contacts between the generator and the motor for opening and closing said power circuit, separate exciting means for generator, means for opening the clutch and closing the sliding contacts in one movement, means for closing clutch and opening slidable contacts in one movement and means for controlling the separate exciting means of the generator to prevent arcing at the opening and closing of said slidable contacts.

7. The power translator comprising an acyclic generator having a separate exciting coil, an acyclic motor including an armature, separate means for exciting the generator field, brushes conveying current from generator to motor in a manner such as to set up an opposition to the primary generator exciting means, a clutch between generator and motor for direct coupling of said generator and motor, brush elements collecting current from said motor armature, adapted also to excite the motor field magnetically, means for conveying current back from motor to generator including slidable contacts, means for operating the clutch to open and the brushes to make contact with one movement, means for closing the clutch and raising said brush contacts with one movement, means for closing the circuit of the separate exciting coil of the generator after the clutch is open and brush contact is made and means for breaking said circuit of the separate exciting coil before brushes are raised and clutch is closed.

8. The power translator comprising a generator, means for forming a generator field, a motor having a field, voltage regulating means including a restricted common path for the magnetic circuits of both generator and motor, brushes adapted to convey current from generator to motor armature, said brushes carrying current in a circular direction within the region of the generator magnetic field in such a manner as to reduce the effective generator field strength with increase of generator current flow.

9. The power translator comprising a generator, means for forming a generator field, a motor having a field, voltage regulating means including a restricted common path for the magnetic circuits of both generator and motor, brushes adapted to convey current from generator to motor armature, said brushes carrying current in a circular direction within the region of the generator magnetic field in such a manner as to reduce the effective generator field strength with increase of generator current flow, said reduction of generator field strength co-acting with the increase in motor field strength due to increased current flow.

10. The vehicle drive comprising a prime mover having a throttle, a generator, a motor, a clutch between generator and motor adapted to be opened for electrical driving and closed for direct driving, slidable brush contacts between the generator and motor adapted to be raised from contact for direct driving and lowered into contact for electrical driving, means operative upon the prime mover throttle to slightly open said throttle when brush contacts are made for electrical driving and means to permit closing of throttle when brush contacts are raised.

11. The vehicle drive comprising a prime mover, a generator, a motor, means for conveying magnetic flux of both generator and motor through the motor armature, a clutch between generator and motor adapted to be opened for electrical driving and closed for direct driving and mechanical means for reversing the direction of rotation of the vehicle drive shaft.

12. The power translator comprising a generator, a motor, a common path for both magnetic circuits of generator and motor, said common path being restricted in magnetic permeability such that at no time will it permit of full saturation by both magnetic circuits simultaneously and said common path comprising the motor armature.

13. The power translator comprising a generator, a motor, means for conveying a current circuit between generator and motor, said means comprising a motor armature acting also as a common path for both generator and motor magnetic circuits, said magnetic circuit traversing the common path side by side, said common path being restricted in magnetic capacity such that at no time will it simultaneously afford a path for both magnetic circuits at their maximums, a generator armature, and a common stator, said armatures and the stator being electrically connected by brushes to complete the current circuit.

14. The power translator comprising a generator, a motor, means for conveying a current circuit between generator and motor, said means comprising a motor armature acting also as a common path for both generator and motor magnetic circuits, said magnetic circuits traversing the common path side by side, said common path being restricted in magnetic capacity such that at no time will it simultaneously afford a path for both magnetic circuits at their maximums, a generator armature and a common stator, said armatures and the stator being electrically connected by brushes to complete the current circuit, certain of said brushes being arranged to aid in providing said magnetic circuits.

15. The power translator comprising a generator, a motor, means for conveying a current circuit between generator and motor, said means comprising a motor armature acting also as a restricted path for both generator and motor magnetic circuits, generator and motor magnetic circuits, a generator armature, and a common stator, said armatures and the stator being electrically connected by brushes to complete the current circuit, the brushes between the armatures providing at least part of the generator magnetic field and the brushes between the motor armature and stator providing at least part of the motor magnetic field.

16. The power translator comprising an acyclic generator, an acyclic motor, a single path for the electrical power circuit thereof, a clutch between motor and generator for mechanically connecting them, brush elements operating upon the generator and motor rotating elements, said brush elements forming the active magnetic fields for the operation of said acyclic motor, said brush elements forming a portion of said power circuit.

17. The power translator comprising an acyclic generator, an acyclic motor, a single path power current circuit, means for separately exciting and forming a generator field, brushes conveying current from the generator armature to the motor armature so arranged as to create a differential magnetization in said generator field.

18. The power translator comprising a generator, means for forming a generator field, a motor having a field, voltage regulating means including a restricted common path for the magnetic circuits of both generator and motor, brushes adapted to convey current from generator to motor armature, said brushes carrying current in a circular direction within the region of the generator magnetic field in such a manner as to reduce the effective generator field strength with increase of generator current flow, said current flow being a function of the rate of motor rotation.

19. The power translator comprising a generator, means for forming a generator field, a motor having a field, voltage regulating means including a restricted common path for the magnetic circuits of both generator and motor, brushes adapted to convey current from generator to motor armature, said brushes carrying current in a circular direction within the region of the generator magnetic field in such a manner as to reduce the effective generator field strength with increase of generator current flow, said reduction of generator field strength co-acting with the increase in motor field strength due to increased current flow at reduced motor speeds.

In testimony whereof, I have signed my name to this specification this 4th day of March, 1927.

MARTIN P. WINTHER.